United States Patent [19]

Ng et al.

[11] Patent Number: 5,666,278

[45] Date of Patent: Sep. 9, 1997

[54] HIGH VOLTAGE INVERTER UTILIZING LOW VOLTAGE POWER SWITCHES

[75] Inventors: Chai-Nam Ng; P. John Dhyanchand; Vietson M. Nguyen, all of Rockford, Ill.

[73] Assignee: Sundstrand Corporation, Rockford, Ill.

[21] Appl. No.: 299,730

[22] Filed: Sep. 1, 1994

Related U.S. Application Data

[63] Continuation-in-part of Ser. No. 981,043, Nov. 24, 1992, abandoned.

[51] Int. Cl.[6] .................................................. H02M 7/00
[52] U.S. Cl. ................................................ 363/71; 363/65
[58] Field of Search ............................. 363/1–5, 43, 45, 363/65, 71

[56] References Cited

U.S. PATENT DOCUMENTS

| | | | |
|---|---|---|---|
| 3,792,286 | 2/1974 | Meier | 307/58 |
| 4,698,739 | 10/1987 | Paice | 363/71 |
| 5,057,808 | 10/1991 | Dhyanchand | 363/43 X |
| 5,177,460 | 1/1993 | Dhyanchand et al. | 363/43 X |
| 5,304,882 | 4/1994 | Lipo et al. | 310/156 |
| 5,334,898 | 8/1994 | Skybyk | 310/268 |

Primary Examiner—Peter S. Wong
Assistant Examiner—Jessica Han
Attorney, Agent, or Firm—Sundstrand Corporation

[57] ABSTRACT

An inverter includes first and second subinverters each having inputs connected in series with the input of the other subinverter across a DC voltage and each further having a switch coupled to an output. A summing circuit includes a first input coupled to the output of the first subinverter, a second input coupled to the output of second inverter and an output. A control circuit is coupled to the subinverters and operates the switches such that a summed AC waveform is produced at the output of the summing circuit. Each switch is subjected to only a portion of the DC voltage.

13 Claims, 10 Drawing Sheets

HIGH VOLTAGE INVERTER UTILIZING LOW VOLTAGE POWER SWITCHES

This is a Continuation-in-Part of U.S. application Ser. No. 07/981,043, filed Nov. 24, 1992,now abandoned.

TECHNICAL FIELD

The present invention relates generally to DC/AC converters, and more particularly to a high voltage inverter capable of using relatively low voltage power switches.

BACKGROUND ART

Inverters are often used in variable-speed, constant-frequency power conversion systems to convert DC power produced by a synchronous generator and a rectifier bridge into AC power for energizing one or more AC loads. In aircraft and aerospace applications, there is always a need to reduce size and/or weight. In power conversion systems used in such applications, size and weight can be reduced by transmitting power over feeders from the generator to the rectifier bridge and from the rectifier bridge to the inverter over DC link feeders at high voltages, thus allowing the use of lighter feeders. While increasing the DC link voltage forces consideration of various other aspects of inverter design, such as corona effects resulting from high voltages at high altitudes, insulation requirements, layout of cables from the generator to the converter, etc., it is clear that the trend is toward the use of relatively high voltages rather than low voltages on the DC link.

In systems of the foregoing type where the power devices must be rated to handle the full DC link voltage, and taking into account the usual derating factor for power devices which, in the aerospace industry, is on the order of 0.6, one must use switching devices rated to handle at least 900 volts for a 540 volt DC link system. While such devices are currently available, it would be desirable to be able to use lower rated devices that have faster switching speeds and lower conduction voltage drops, are more cost effective and efficient and require less cooling. Also, the ability to use lower rated devices can in turn permit the use of newly-developed static induction transistors (SIT's) which have a substantially lower value of $V_{CESAT}$ which in turn further reduces switch power dissipation levels.

Paice U.S. Pat. No. 4,698,739 discloses a twelve-pulse motor drive wherein first and second inverters are coupled to primary and secondary windings of a delta-star transformer. In one embodiment shown in FIG. 4 of the Paice patent, the inverters include inputs coupled together in series across a pair of DC sources. It is noted at column 4 lines 65–68 of the Paice patent that the delta-star type transformer can be replaced by a transformer of a different design, such as a transformer of the zig-zag winding type. An acknowledgement is also made at column 1, lines 19–24 of the Paice patent that it is generally known to assemble in series a plurality of single phase inverters in order to obtain a high voltage inverter system. However, the inverters disclosed by Paice all fail to provide isolation between input and output and do not provide a neutral so that unbalanced loads cannot be driven.

Frank, et al., U.S. Pat. No. Re. 29,560, Kernick, U.S. Pat. No. 3,614,590, Ve Nard II, U.S. Pat. No. 3,638,094, Compoly, et al., U.S. Pat. No. 3,775,662, Meier, U.S. Pat. No. 3,792,286, Klein, U.S. Pat. No. 3,979,662, Forstbauer, U.S. Pat. No. 4,063,143, Lipman, U.S. Pat. No. 4,204,264, Honbu, et al., U.S. Pat. No. 4,549,258, Paice, et al., U.S. Pat. No. 4,674,024, Lipman, U.S. Pat. No. 4,975,822, Patel, et al., U.S. Pat. No. 5,008,797, Dhyanchand, et al., U.S. Pat. No. 5,027,265, Dhyanchand, et al., U.S. Pat. No. 5,031,086, Rozman, et al., U.S. Pat. No. 5,036,451, Dhyanchand, et al., U.S. Pat. No. 5,040,105, Dhyanchand, et al., U.S. Pat. No. 5,041,957, Dhyanchand, et al., U.S. Pat. No. 5,041,958, Dhyanchand, et al., U.S. Pat. No. 5,057,808 and Nguyen, et al., U.S. Pat. No. 5,065,303 disclose inverters having power switches which are subjected to substantially the entire magnitude or a portion of voltage appearing on a DC link.

Japanese patent publication 54-10923 and Soviet Union patent publications 504,282 and 1,170,570 appear to disclose inverters and controls therefor.

SUMMARY OF THE INVENTION

In accordance with one aspect of the present invention, an inverter includes subinverters having switches that experience only a fraction of the DC link voltage provided thereto, and hence lower rated devices can be used.

More particularly, an inverter includes first and second subinverters each having inputs connected in series with the inputs of the other subinverter across a DC voltage and each further having a switch coupled to an output. A summing transformer includes a first primary winding coupled to the output of the first subinverter, a second primary winding coupled to the output of the second subinverter and a secondary winding. Means are coupled to the subinverters for operating the switches such that a summed AC waveform is produced at the output of the summing circuit wherein each switch is subjected to a portion of the DC voltage.

In accordance with a preferred form of the present invention, the operating means includes means for producing a pulse-width modulated (PWM) waveform and means responsive to the producing means for deriving switch control waveforms for the subinverter switches from the PWM waveform.

In accordance with a further aspect of the present invention, an inverter includes first and second subinverters each having inputs connected in series with the inputs of the other subinverter across a DC voltage and each further having a plurality of switches coupled to a plurality of phase outputs. A summing transformer includes a first set of primary windings coupled to the plurality of phase outputs of the first subinverter, a second set of primary windings coupled to the plurality of phase outputs of the second subinverter and a set of secondary windings. Means are coupled to the subinverters for operating the switches such that summed AC phase voltages are produced across the set of secondary windings wherein each switch is subjected to a portion of the DC voltage.

In accordance with yet another aspect of the present invention, a method of producing an AC waveform using first and second subinverters each having first and second inputs and an output includes the steps of providing a DC source having first and second terminals and connecting the second input of the first subinverter to the first input of the second subinverter, the first input of the first subinverter to the first terminal of the DC source and the second input of the second subinverter to the second terminal of the DC source. A summing circuit is provided having a pair of inputs and an output wherein the output is electrically isolated from the inputs and the outputs of the subinverters are connected to the pair of inputs of the summing circuit. The subinverters are operated to produce a summed waveform at the output of the summing circuit.

Because the power switches of the subinverters are subjected to only a fraction of the DC voltage supplied to the subinverters, lower power devices can be used, with all the advantages attendant thereto. Also, electrical isolation between input and output is realized and, if necessary or desirable, a neutral may be provided.

The system has the advantage that it can function to operate both balanced and unbalanced loads, and can supply single phase, three phase, and phase-to-phase power to loads.

DESCRIPTION OF THE PREFERRED EMBODIMENT

Figure 1:
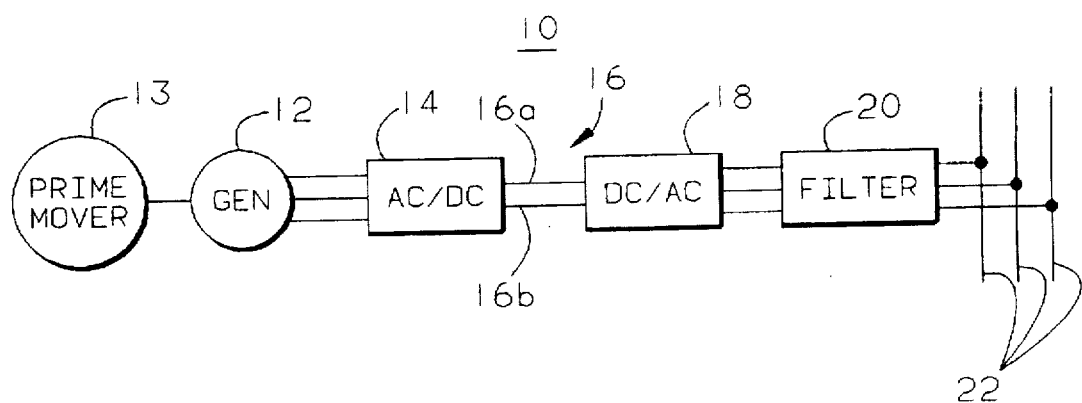
FIG. 1 comprises a block diagram of a power generating system including an inverter according to the present invention.

Referring now to FIG. 1, a power generating system 10 includes a brushless, synchronous generator 12 driven by a prime mover 13 such as an aircraft jet engine. The generator 12 develops three-phase variable frequency power which is converted into DC power by an AC/DC converter 14. The DC power is supplied over a DC link 16 comprising link conductors 16a, 16b to a DC/AC converter or inverter 18. As a general matter, the DC power may be developed by any DC source having first and second terminals coupled to the link conductors 16a, 16b. The DC power is converted into constant-frequency AC power which is supplied to a filter 20. If necessary or desirable, a neutral forming transformer (not shown) may be utilized to obtain a neutral from the output phase voltages of the inverter 18. The resulting AC power is supplied over a load bus 22 to one or more AC loads, as described in greater detail hereinafter.

Figure 2:
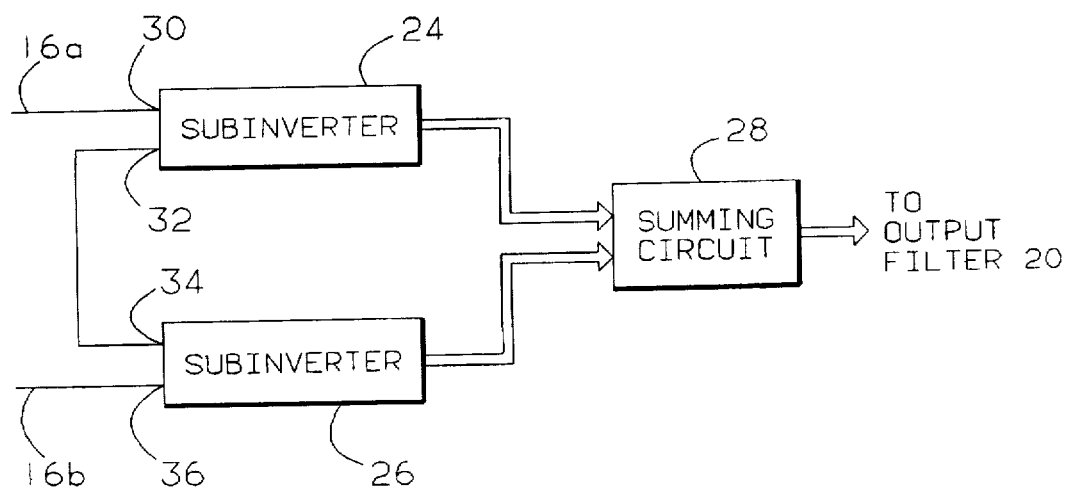
FIG. 2 is a generalized block diagram of the inverter of the present invention.

Referring now to FIG. 2, the inverter 18 includes first and second subinverters 24, 26 coupled to a summing circuit 28. The first subinverter 24 includes first and second inputs 30, 32 whereas the second subinverter 26 includes first and second inputs 34, 36. In accordance with the present invention, the second input 32 of the subinverter 24 is coupled to the first input 34 of the subinverter 26 while the first input 30 of the subinverter 24 is connected to the link conductor 16a and the second input of the subinverter 36 of the subinverter 26 is coupled to the second link conductor 16b. This places the subinverters 24 and 26 in series between the link conductors 16a, 16b. As noted in greater detail hereinafter, the waveforms produced by the subinverters 24, 26 are summed by the summing circuit 28 to produce a set of summed waveforms which are supplied to the output filter 20.

Figure 3:
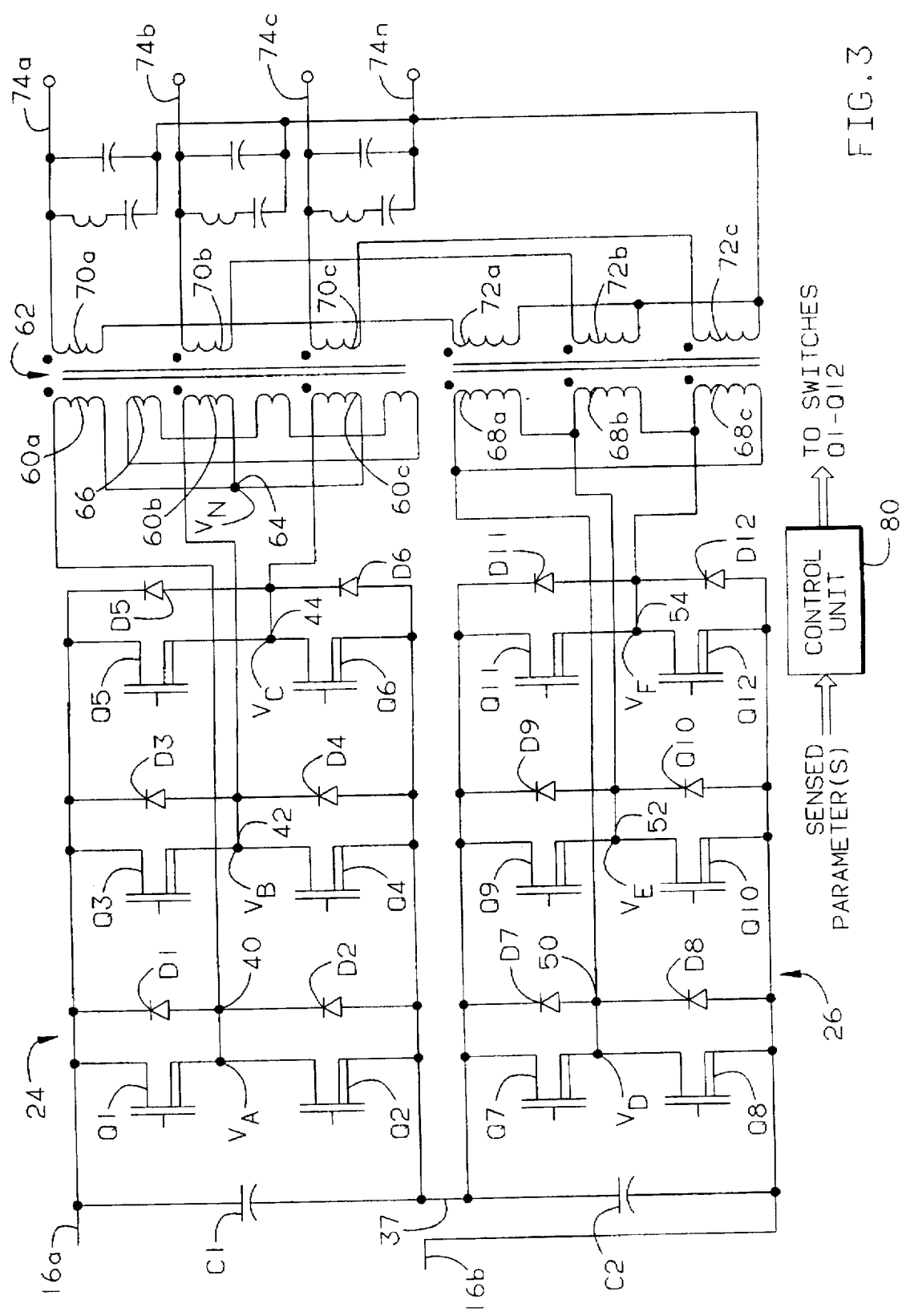
FIG. 3 comprises a combined simplified schematic and block diagram of the inverter of FIG. 2.

FIG. 3 illustrates the design of the subinverters 24, 26 in greater detail. First and second capacitors C1, C2 are coupled in series across the DC link conductors 16a, 16b and act as a potential divider to cause the voltage at a junction 37 to be substantially equal to one-half the voltage across the DC link conductors 16a, 16b. The capacitors C1, C2 also provide a low impedance path for DC harmonic currents and thus decouple DC ripple voltage on the DC link caused by PWM harmonic currents flowing in the series-connected subinverters 24, 26.

Each subinverter 24, 26 includes first through sixth power switches Q1–Q6 and Q7–Q12, respectively. Flyback diodes D1–D6 are connected in anti-parallel relationship across the power switches Q1–Q6 while flyback diodes D7–D12 are connected in anti-parallel relationship across the power switches Q7–Q12. Three-phase output waveforms are produced at phase outputs 40, 42 and 44 of the subinverter 24 while three-phase output waveforms are produced at phase outputs 50, 52 and 54 of the subinverter 26.

In the preferred embodiment, the power switches Q1–Q12 comprise static induction transistors (SIT's), inasmuch as such transistors have a high switching speed and low $V_{CESAT}$. This results in low power dissipation by each power switch. It should be noted, however, that the power switches Q1–Q12 could instead be realized by other types of power switching devices such as bipolar transistors, insulated gate bipolar transistors, MOS controlled thyristors, SCR's or the like.

The junctions 40–44 are coupled to first ends of a first set of three primary windings 60a, 60b, 60c of a summing transformer 62. Second ends of the windings are connected together at a common junction 64 so that the windings are connected together in a wye configuration. A voltage balancing tertiary winding 66 may be utilized in association with the primary windings 60a–60c, if desired.

The junctions 50, 52 and 54 are connected to a second set of primary windings 68a, 68b and 68c of the summing transformer 62. The windings 68a–68c are connected together in a delta configuration.

The summing transformer 62 further includes a first set of secondary windings 70a–70c electrically isolated from but magnetically linked with the first set of primary windings 60a–60c and a second set of secondary windings 72a–72c electrically isolated from but magnetically linked with the second set of primary windings 68a–68c. The windings 70a and 72a are connected in series between a phase output 74a and a neutral line 74n. In like fashion, the windings 70b and 72b are connected in series between a phase output 74b and the neutral line 74n whereas the windings 70c and 72c are connected in series between a phase output 74c and the neutral line 74n.

Summing transformers of the foregoing type are known in the art. See, for example, the Dhyanchand, et al. '265 patent referred to above which discloses an analogous summing transformer having four primary windings and four secondary windings.

A major advantage of the system 10 heretofore described is that it can supply, as desired, either single phase power, phase-to-phase power, or three phase power to a load or loads. Reference is now made to FIGS. 10–13, which illustrate various combinations of phase power being supplied to a load.

Figure 10:
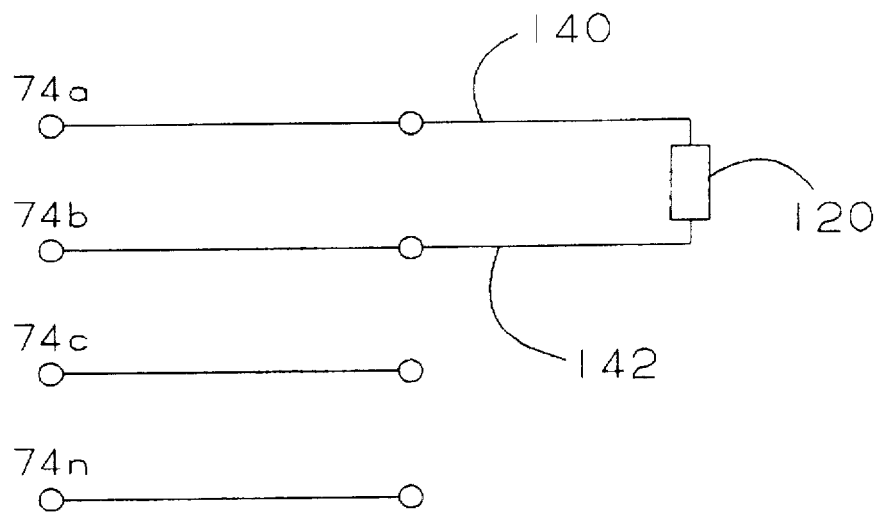
FIGS. 10 to 13 illustrate the various combinations of single phase, phase-to-phase, and three phase power which can be supplied to loads.
Figure 11:
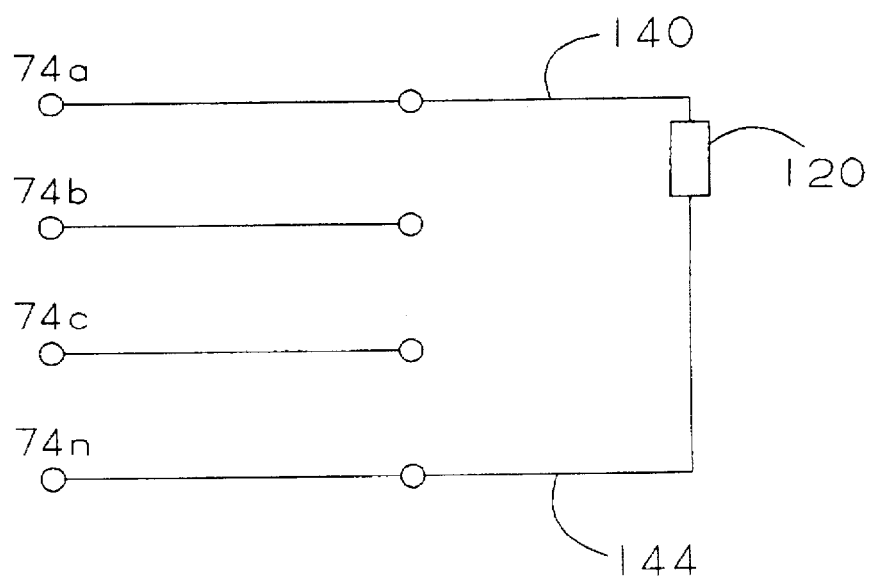

Referring now more particularly to FIG. 10, therein is illustrated that the system 10 can supply phase-to-phase power to the load. As can be seen, the load 120 has a first lead 140 connected to phase output 74a, and a second lead 142 connected to phase output 74b. FIG. 11 illustrates that the load 120 can be supplied single phase power, as the load 120 has a first lead 140 connected to output phase 74a, and a second lead 144 connected to neutral output 74n.

Figure 13:
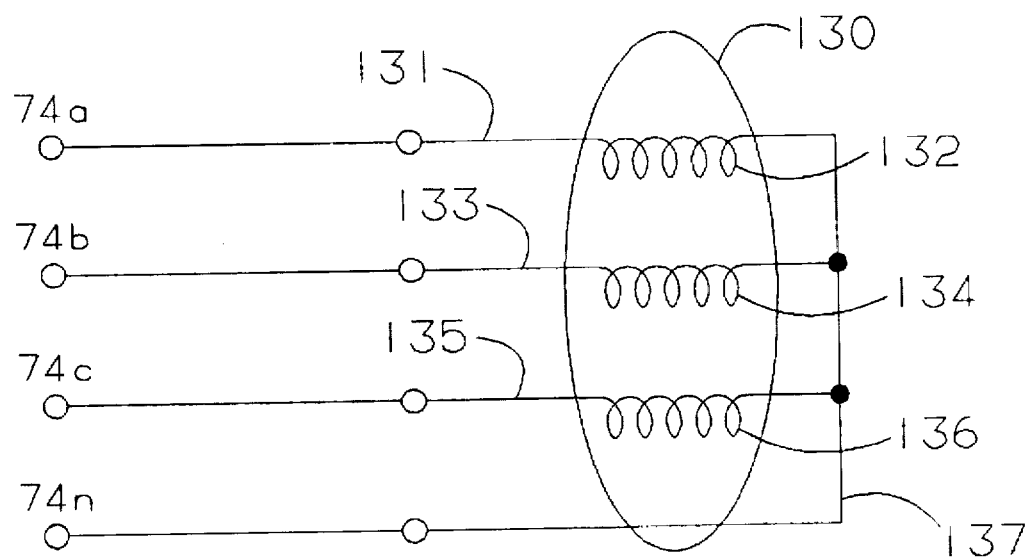

The system 10 can also supply three phase, four wire power to a balanced load, as illustrated in FIG. 13. In this Figure, the load 130 may be, for example, a three phase motor, having stator windings 132, 134, 136 which would closely match each other. Lead 131 connects the first stator winding 132 to phase output 74a, lead 133 connects the second stator winding 134 to the phase output 74b, and lead 135 connects the third stator winding 136 to the phase output 74c. Neutral return lead 137 connects each of the windings 132, 134, 136 to the neutral output 74n.

Figure 12:
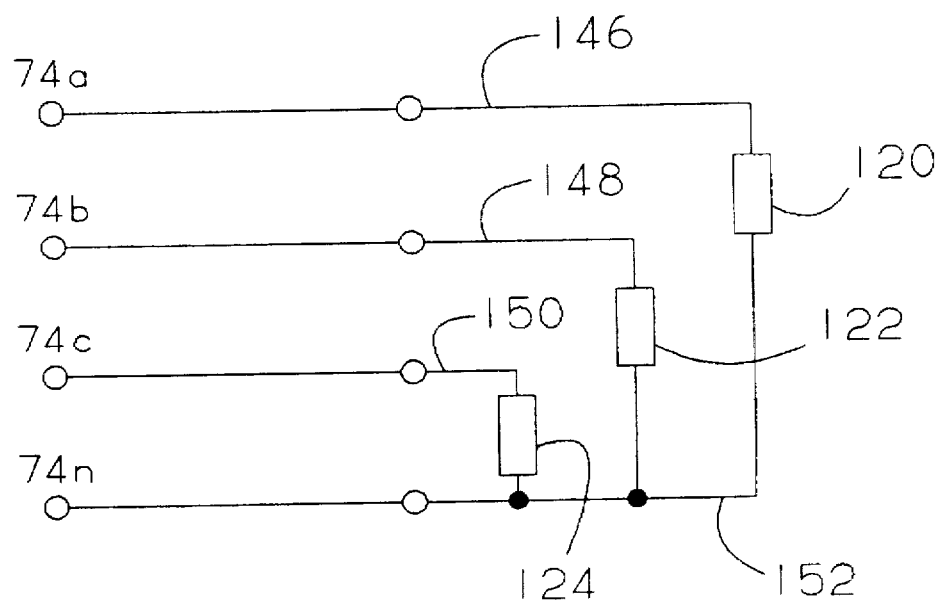

FIG. 12 illustrates the circumstance where the system 10 supplies single phase power to three unbalanced loads 120, 122, 124. Output phase lead 146 connects the first load 120 to output phase 74a, output phase lead 148 connects the second load 122 to output phase 74b, and output phase lead 150 connects the third load 124 to output phase 74c. Neutral return lead 152 connects each of the load 120, 122, 124 to the neutral output 74n.

In the circumstance illustrated in FIG. 12, the loads 120, 122, 124 can be dissimilar from each other. In other words, the load 120 can or cannot be the same as load 122 or load 124, and load 122 can or cannot be the same as load 124. For example, the load 120 could be 10 kw, the load 122 could be 5 kw, and the load 124 could be 15 kw. Regardless of the dissimilarity of the loads, the system described still functions to supply appropriate power to each load.

Figure 4:
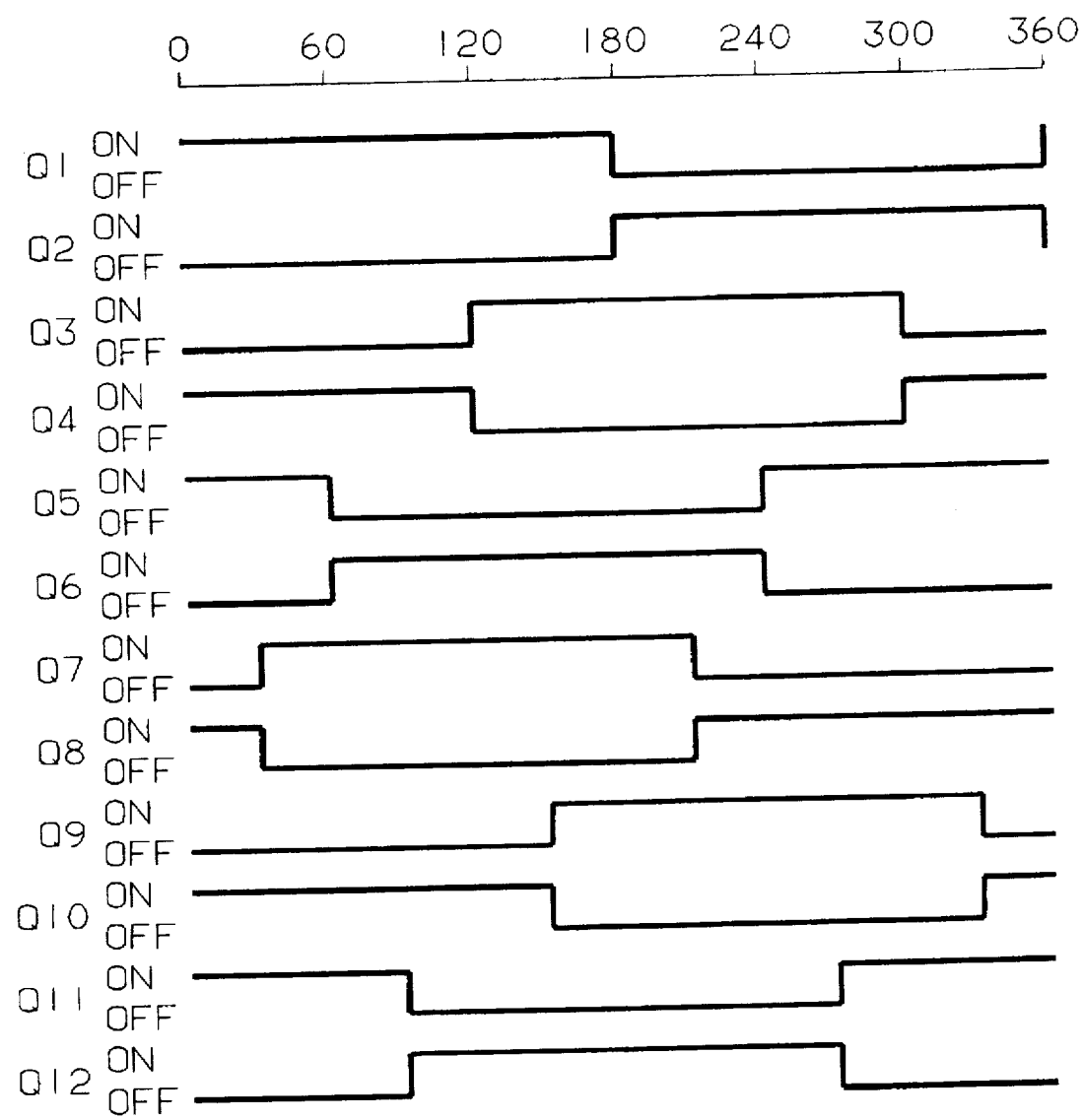
FIG. 4 comprises a series of timing diagrams illustrating the operation of the switches of the subinverters shown in FIG. 3.
Figure 5:
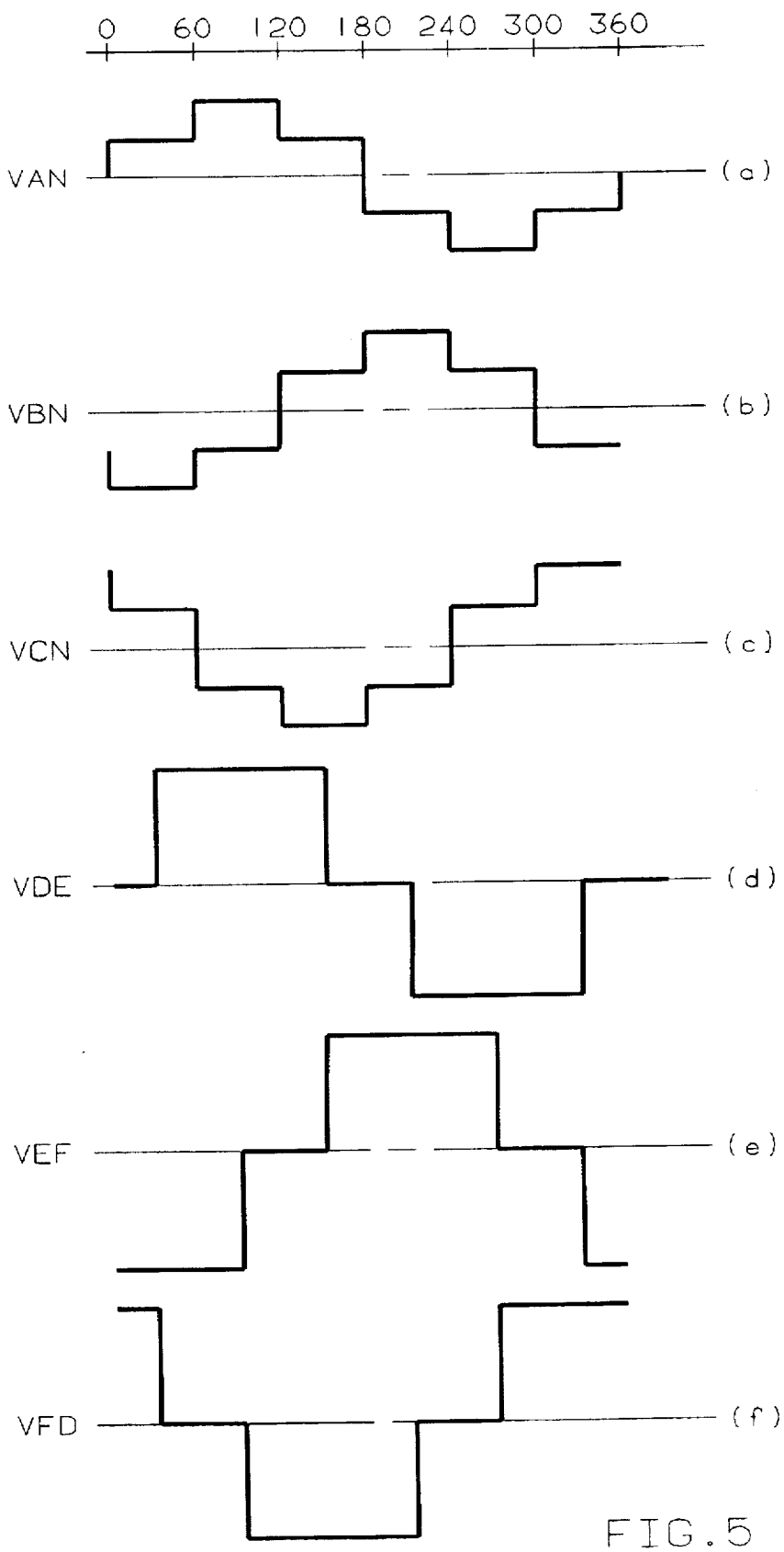
FIG. 5 comprises a series of waveform diagrams illustrating phase-to-neutral voltages developed by the subinverter 24 and phase-to-phase voltages developed by the subinverter 26 of FIG. 2.

The switches Q1–Q12 are operated in dependence upon one or more sensed parameters by a control unit 80. The timing diagrams of FIG. 4 illustrate typical operation of the switches Q1–Q12 according to one embodiment of the present invention. Each switch is rendered conductive for 180° in complimentary fashion with the other switch to which it is connected. Thus, for example, the switch S1 is rendered conductive between 0° and 180° while the transistor Q2 is off and the transistor Q1 is turned off and the transistor Q2 is turned on between 180° and 360°. A transition between on and off states of a series-connected pair of switches occurs every 30° in the inverter as a whole. The resulting phase-to-neutral voltages developed at the output of the subinverter 24 are shown as waveforms (a)–(c) in FIG. 5. Corresponding phase waveforms are produced by the subinverter 26, except that such waveforms lag the waveforms (a)–(c) by 30°. Waveforms (d)–(f) of FIG. 5 illustrate the phase-to-phase voltages developed by the subinverter 26, it being understood that the subinverter 24 develops identical phase-to-phase voltages except that such waveforms lead the waveforms (d)–(f) by 30°.

The summing transformer 62 sums the voltage waveforms produced by the subinverters 24 and 26 to obtain three-phase, twelve-step waveforms. If necessary or desirable, additional pairs of series-connected subinverters may be connected across the DC link conductors 16a 16b and the outputs thereof summed by the summing transformer 62 to obtain output waveforms having a different number of steps, such as 24-step, 36-step or 48-step. In this case, the summing transformer 62 would have additional sets of primary and secondary windings connected in the fashion shown in FIG. 3.

Figure 6:
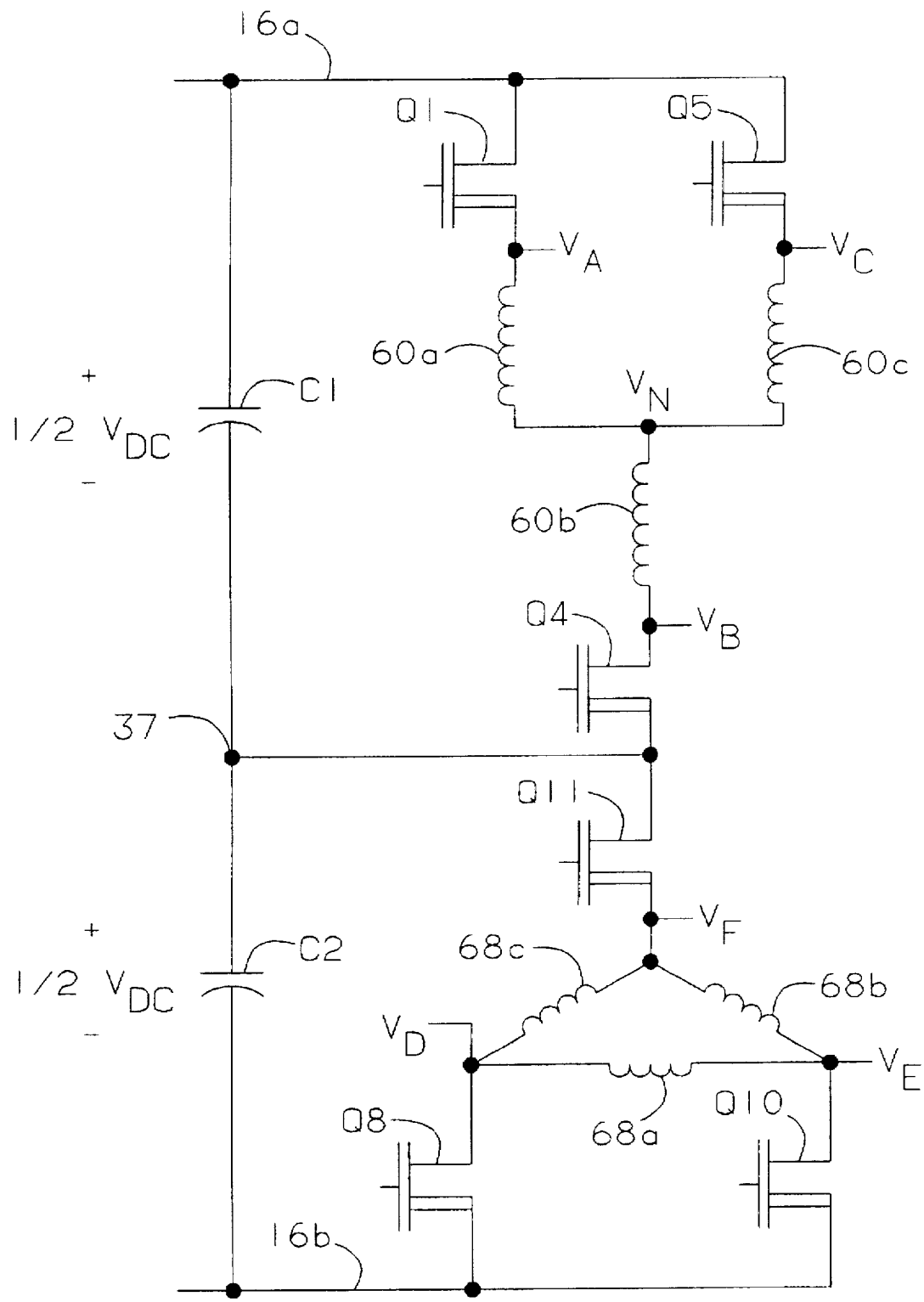
FIGS. 6 and 7 are equivalent circuit diagrams of the subinverters 24 and 26 of FIG. 3 during operation between 0° and 30° and between 30° and 60°, respectively, of the waveforms of FIG. 4.
Figure 7:
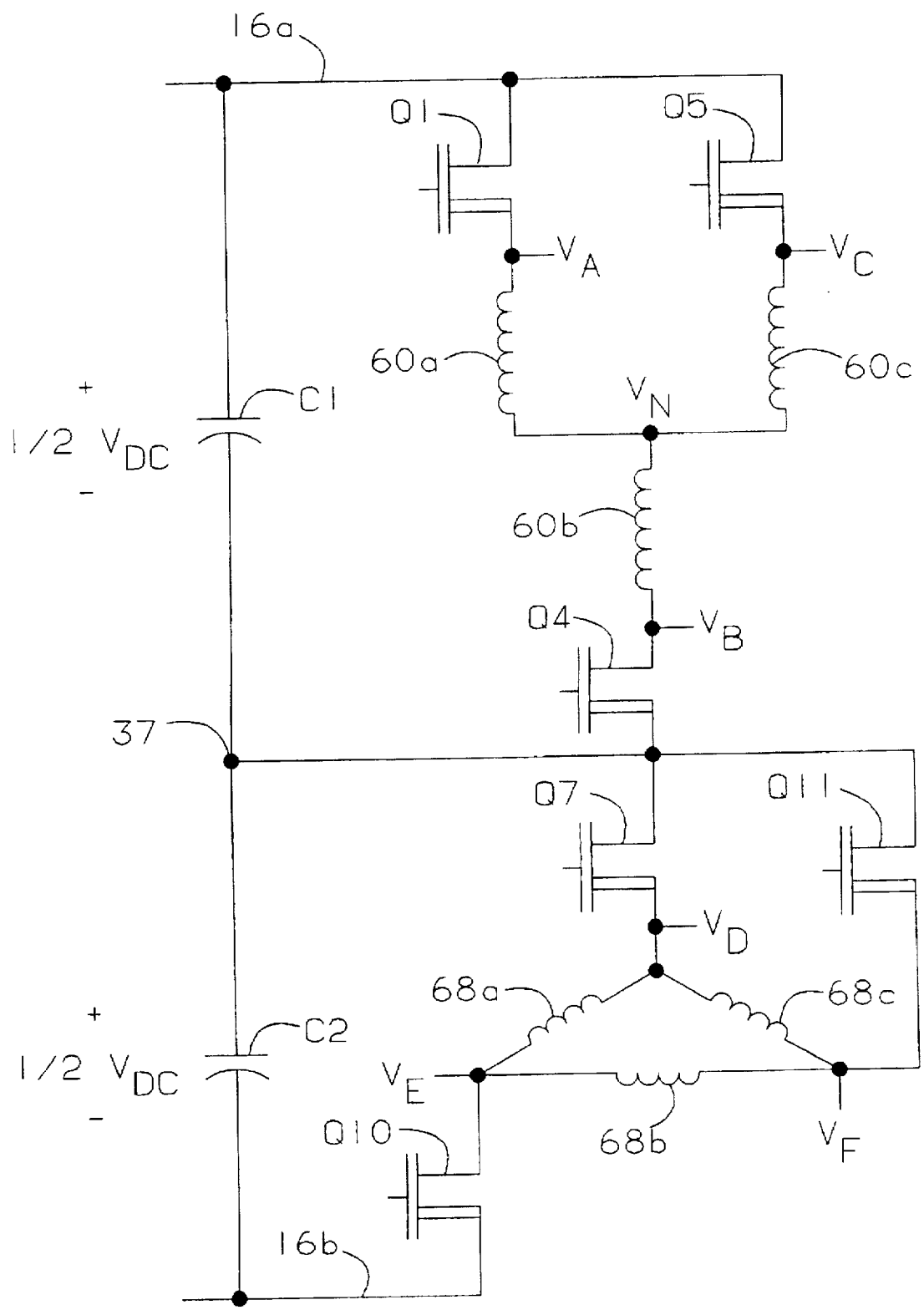

FIG. 6 illustrates the interconnection of the switches and windings 60a–60c and 68a–68c during the interval between 0° and 30° of the timing diagram of FIG. 4. FIG. 7 illustrates the interconnection of the switches and windings during the interval between 30° and 60° of the timing diagram of FIG. 4. Those switches which are open during these periods, as well as the diodes D1–D12, are not shown in FIGS. 6 and 7 for the sake of simplicity. As should be evident from an inspection of FIGS. 6 and 7, each switch is subjected to only a fraction of the voltage $V_{DC}$ appearing across the DC link 16. In fact, it can be shown that each of these switches Q1–Q12 is subjected to at most half of the total DC link voltage in each cycle of the inverter output. The control unit 80 includes known components which control the switches Q1–Q12 in accordance with the timing diagrams of FIG. 4. According to an alternative embodiment of the present invention, the control unit 80 may include the elements shown in FIG. 8 in order to obtain stepped-waveforms having PWM patterns superimposed thereon. In accordance with the embodiment of FIG. 8, one or more sensed parameters are detected by a pattern selection circuit 100, which in turn develops a high order addressing signal for selecting a particular portion or block of a memory 102. A clocking circuit 104 develops low order addresses for sequentially accessing memory locations in the block of memory selected by the pattern selection circuit 100. The memory 102 develops a pulse-width modulated (PWM) pattern which is in turn supplied to a three-phase logic circuit 106. The logic circuit 106 develops control waveforms for the switches Q1–Q12 which are conditioned, amplified and isolated, as needed, for proper operation of the switches Q1–Q12. The resulting phase output voltages take the form shown in FIG. 9 which illustrates the phase C output voltage referenced to neutral before filtering by the output filter 20. The phase A and phase B output voltages relative to neutral are identical to that shown in FIG. 9 except shifted in phase by 120° and 240°, respectively.

The operation of the subinverters 24, 26 is explained in greater detail in Nguyen, et al. U.S. patent application Ser. No. 07/709,118, entitled "Stepped Waveform Inverter Utilizing Pulse-Width Modulation", filed Jun. 3, 1991, and assigned to the assignee of the present application (Sundstrand Docket No. B03820-AT1-USA) the disclosure of which is incorporated by reference herein. By superimposing pulse-width modulated patterns on the stepped-waveform output voltages, harmonic content can be significantly improved, thereby permitting a highly desirable decrease in output filter size and weight.

Figure 8:
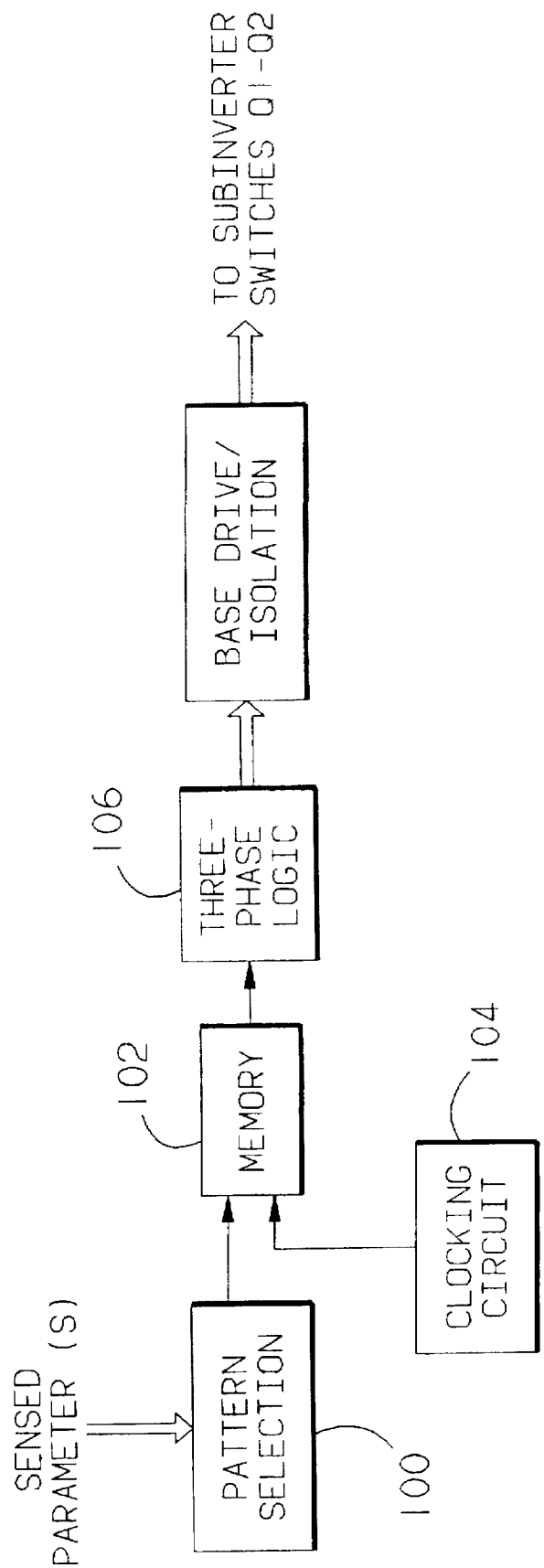
FIG. 8 comprises a block diagram of a portion of the control unit of FIG. 3 according to an alternative embodiment of the present invention.
Figure 9:
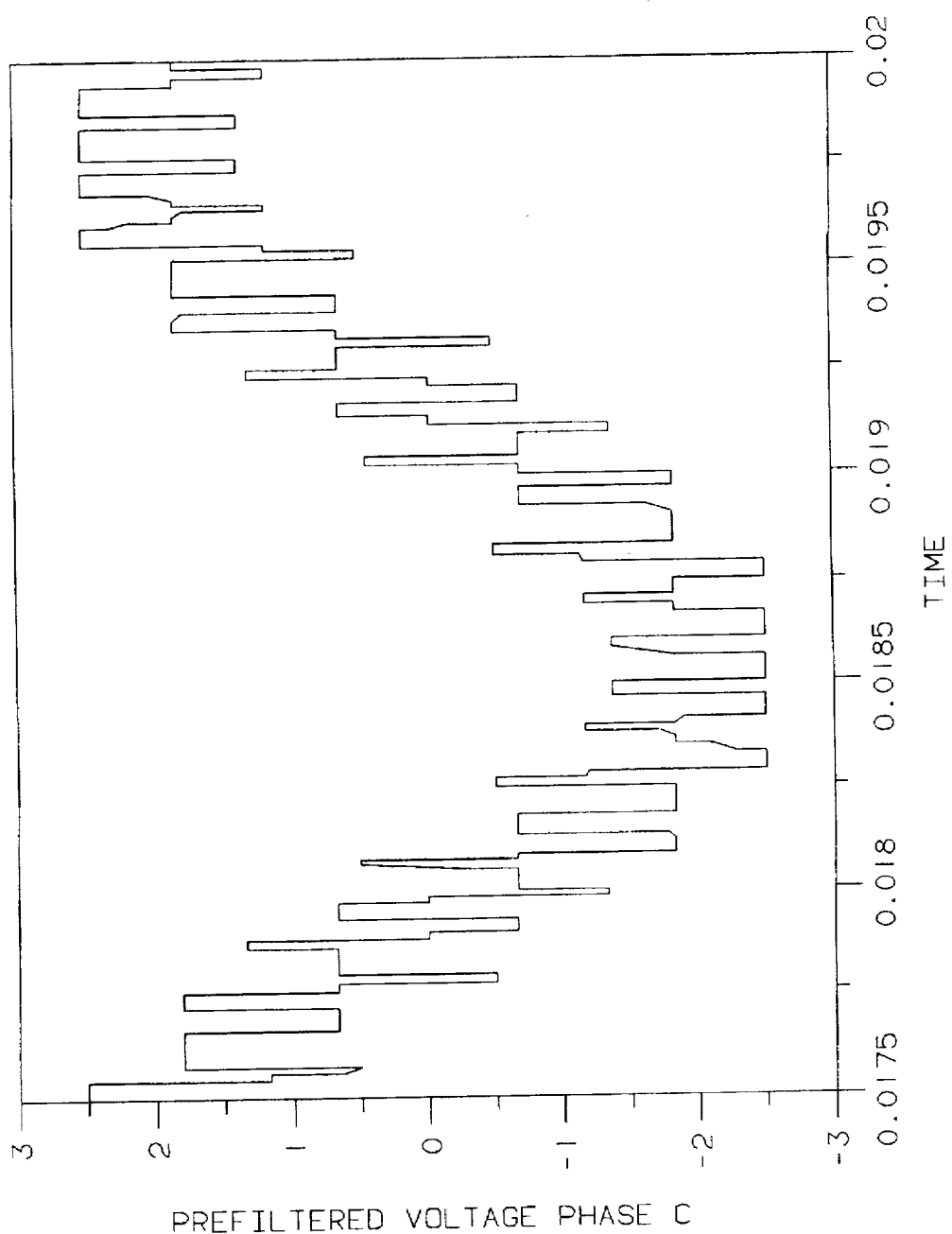
FIG. 9 comprises a waveform diagram illustrating one of the phase outputs produced by the inverter of FIG. 3 when operated by a control unit incorporating the elements of FIG. 8 according to an alternative embodiment.

Again, similar to the previous embodiment, the twelve-step inverter controlled by the controller shown in part in FIG. 8 may be replaced by an inverter utilizing additional subinverters to form 24-step, 36-step or 48-step waveforms having PWM pattern superimposed thereon. In this case, a controller for varying the phase angle between pairs of subinverters may be utilized to accomplish output voltage regulation. Such a controller is disclosed in the above-identified Nguyen, et al. application incorporated by reference herein. Such a control increases control freedom over the output waveforms.

In the case of the embodiments wherein PWM patterns are superimposed on a stepped-wave output, improved harmonic distortion and lower switching frequency with increased control freedom are obtained as compared with a conventional PWM inverter. In all of the embodiments described above, the use of a summing transformer results in an isolated output having no DC content therein. Fewer components are necessary and improved weight, size and efficiency are realized. The design is cost effective inasmuch as low power switches can be used, for example 600 volt devices in a 540 volt DC link system.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. An electrical system, comprising:

first and second subinverters each having inputs connected in series with the inputs of the other subinverter across a DC voltage and each further having a switch coupled to an output;

a summing transformer having a first primary winding connected in a wye configuration coupled to the output of the first subinverter, a second primary winding connected in a delta configuration coupled to the output of the second subinverter and a secondary winding, and a secondary winding having a plurality of phase outputs;

means coupled to the subinverters for operating the switches such that a summed AC waveform is produced at the secondary winding of the summing transformer and wherein each switch is subjected to a portion of the DC voltage; and a load coupled between two of said secondary winding phase outputs.

2. The electrical system of claim 1, wherein the operating means includes means for producing a pulse-width modulated (PWM) waveform and means responsive to the producing means for deriving switch control waveforms for the subinverter switches from the PWM waveform.

3. An electrical system, comprising:

first and second subinverters each having inputs connected in series with the inputs of the other subinverter across a DC Voltage and each further having a plurality of switches coupled to a plurality of phase outputs;

a summing transformer having a first set of primary windings coupled to the plurality of phase outputs of the first subinverter, a second set of primary windings coupled to the plurality of phase outputs of the second subinverter and a set of secondary windings having a plurality of phase outputs and a neutral output;

means coupled to the subinverters for operating the switches such that summed AC phase voltages are produced across the set of secondary windings and wherein each switch is subjected to a portion of the DC voltage; and a first load connected between one of said secondary winding phase outputs and said neutral output.

4. The electrical system of claim 3, wherein the windings of the first set of primary windings are connected in a wye configuration and the windings of the second set of primary windings are connected in a delta configuration.

5. The electrical system of claim 4, wherein the operating means includes means for producing a pulse-width modulated (PWM) waveform and means responsive to the producing means for deriving switch control waveforms for the subinverter switches from the PWM waveform.

6. The electrical system according to claim 3 including a second load connected between another of said secondary winding phase outputs and said neutral output, and wherein said first load is not equal to said second load.

7. The electrical system according to claim 6 including a third load connected between another of said secondary winding phase outputs and said neutral output, and wherein said first and third loads are not equal.

8. The electrical system according to claim 3 including a second load connected between another of said secondary winding phase outputs and said neutral output, and wherein said first load is equal to said second load.

9. The electrical system according to claim 3 including a second load connected between a second of said secondary winding phase outputs and said neutral output, a third load connected between a third of said secondary winding phase outputs and said neutral output, and wherein said first, second and third loads are equal to each other.

10. A method of producing an AC waveform at a plurality of loads using first and second subinverters each having first and second inputs and an output, the method comprising the steps of:

providing a DC source having first and second terminals;

connecting the second input of the first subinverter to the first input of the second subinverter, the first input of the first subinverter to the first terminal of the DC source and the second input of the second subinverter to the second terminal of the DC source;

providing a summing circuit having a pair of inputs and an output wherein the output is electrically isolated from the inputs, said step including supplying a summing transformer having a first set of primary windings connected in a wye configuration, a second set of primary windings in a delta configuration, and a secondary winding having first, second and third phase outputs and a neutral output;

connecting the outputs of the subinverters to the pair of inputs of the summing circuit;

connecting a first load between said first secondary winding phase output and said neutral output;

connecting a second load between said second secondary winding phase output and said neutral output; and operating the subinverters to produce a summed waveform at the output of the summing circuit.

11. The method of claim 10, wherein the step of operating includes the step of deriving a control waveform for the subinverters.

12. The method of claim 10, wherein the step of operating the subinverters comprises the step of supplying the control waveform to the switches whereby the switches are operated to produce stepped phase output voltages across the set of secondary windings of the summing transformer.

13. The method of claim 12, wherein the step of deriving the control waveforms includes the step of developing a pulse-width modulated (PWM) waveform and obtaining the control waveforms from the PWM waveform.

* * * * *